United States Patent [19]

Dölves et al.

[11] 4,013,831
[45] Mar. 22, 1977

[54] METHOD FOR THE PRODUCTION OF PRINTING FORMS

[75] Inventors: Jürgen Dölves; Dieter Grieger, both of Kiel, Germany

[73] Assignee: Dr. -Ing. Rudolf Hell GmbH, Kiel, Germany

[22] Filed: Mar. 12, 1976

[21] Appl. No.: 666,494

[30] Foreign Application Priority Data

Mar. 11, 1975 Germany .......................... 2510533

[52] U.S. Cl. ................................ 358/299; 358/302
[51] Int. Cl.² ........................................ H04N 1/06
[58] Field of Search .......... 178/6.6 R, 6.6 B, 6.7 R, 178/5

[56] References Cited

UNITED STATES PATENTS

| | | | |
|---|---|---|---|
| 3,272,918 | 9/1966 | Koll | 178/6.6 A |
| 3,582,549 | 6/1971 | Hell | 178/6.6 B |
| 3,636,251 | 1/1972 | Daly | 178/6.6 B |
| 3,956,583 | 5/1976 | Pugsley | 178/6.6 B |
| 3,975,761 | 8/1976 | Taudt | 358/78 |

*Primary Examiner*—Howard W. Britton
*Assistant Examiner*—Edward L. Coles
*Attorney, Agent, or Firm*—Ernest F. Marmorek

[57] ABSTRACT

The invention relates to a method for the production of a printing form by the scanning point-by-point and line-by-line of an image pattern along successive cylindrical peripheral image lines and engraving cavities along corresponding cylindrical peripheral engraving lines by an engraving member having an engraving needle as a cutting tool, and includes the steps of generating image signals from the image pattern from along one of the cylindrical peripheral image lines, and engraving a number of cavities at the beginning of an engraving line to depths substantially less than the depths defined by the corresponding image signals.

Then the other cavities of said engraving line are engraved to depths which are defined by the nominal values.

Subsequently the incomplete cavities of said engraving line are re-engraved in accordance with the corresponding image signals.

Another object of the invention is to control the movement of said engraving needle into an engraving position for engraving cavities and into a rest position after an engraving line has been completed.

8 Claims, 6 Drawing Figures

METHOD FOR THE PRODUCTION OF PRINTING FORMS

CROSS-REFERENCE TO RELATED APPLICATION

Reference is had to the patent application of Walter Baar el al. filed on or about Feb. 27, 1976, Ser. No. 661,984 and having the same assignee as the instant patent application.

BACKGROUND OF THE INVENTION

The invention relates to a method for the production of a printing form by the scanning point-by-point and line-by-line of an image pattern and engraving cavities along corresponding cylindrical peripheral engraving lines with the use of a screen.

Generally, an image pattern which is to be reproduced is mounted on a scanning or image cylinder which is rotated during the process. The image pattern is scanned helically by a scanning device such as an optical scanner which is continuously guided parallel to the axis of the image cylinder. The image pattern can contain half-tone images and/or characters. The tone value of the scanned image points determine the amount of the reflected light and the reflected light is detected and converted into image signals. In order to produce a photogravure screen on the engraving cylinder, a screen signal is superimposed over the image signals.

The engraving device includes an engraving member such as a mechanical engraver which uses an engraving needle as a cutting tool. The engraving member moves continuously along the rotating engraving cylinder.

The screen signal creates a vibrating lifting movement of the engraving needle and the image signals determine the penetration depth of the engraving needle or cutting tool into the surface of the engraving cylinder. Thus, a series of cavities of varying depths are produced along a helical line at the surface of the engraving cylinder.

In one prior art system, the image and engraving cylinders are each driven by a separate synchronous motor. Another known system uses a single synchronous motor to rotate the image and engraving cylinders which are rigidly connected axially to each other.

The engraving cylinder is used in a photogravure rotary machine for a printing process. The cylinder is inked and the cavities retain an amount of ink depending upon the respective cavity depth. During the printing process, ink is transferred from the cavities to a printing carrier and the tone-value of the printed surface is determined by the depth of the respective cavities which are disposed in a screen defined on the cylinder surface. For multi-color printing, cavities for each color are engraved on a single cylinder. In the photogravure rotary machine, a color print is produced by superimposing the printing from different engraving cylinders for the respective colors.

In the case where a screen is used, a screen signal produces a vibrating stroke motion for the engraving needle so that a series of cavities are engraved in the rotating engraving cylinder. The image signal determines the depth of the cavities with the black portion of the image pattern corresponding to the greatest depth whereas the white portion of the image pattern corresponds to shallow cavities.

In a method for the production of a printing form by the scanning point-by-point and line-by-line of an image pattern along successive cylindrical peripheral image lines and engraving cavities along corresponding cylindrical peripheral engraving lines, one known process interrupts the scanning during the time the engraving member is moved from one peripheral engraving line to the next. In addition, the engraving needle is abruptly moved into a rest position before engraving the next line and in this position the engraving needle is no longer in contact with the surface of the engraving cylinder. The signal for engraving the first cavity in a line causes an abrupt change in the position of the engraving needle from the rest position to the engraving depth corresponding to the respective image signal.

Generally, between the tone-value for a black portion of the image pattern and the white portion of the image pattern there can be 200 tone-value steps or increments.

The stroke difference for the engraving needle for such a tone-value range amounts to about 0.15 u/m. Irregularities in the tone-value engraved can be disturbing to a person viewing the image printed therefrom.

In order to attain a good reproduction quality, the engraving of the cavities must be done with great precision and this imposes stringent requirements on the mechanical system used in the engraving step.

Generally, an engraving member comprises a stationary electromagnet and a movable rotatable system. The rotatable system includes a shaft connected to a fixed portion, a bearing for the shaft, and a dampening arrangement.

One end of the shaft is connected to a clamped torsion rod and the other end of the shaft carries an arrangement including the engraving needle. The current in the electromagnet is proportional to the image signals and the screen signals and causes a magnetic field which exerts a torque on the torsion rod and thereby results in an angular deflection of the engraving needle from its rest position established by the torsion rod.

The change in the engraving needle from its rest position to its engraving position is abrupt and is dampened by the dampening arrangement in order to prevent overshoot and to minimize uncontrolled oscillations.

Despite the dampening arrangement, it has been found that the sudden change of the engraving needle from its rest position to the engraving of the first cavity in a peripheral line results in a cavity deeper or smaller than it should be according to the image signal. In addition, uncontrolled oscillations of the engraving needle cause undesired cavities to be engraved.

These problems arise because the change of the engraving needle from its rest position to its engraving position and vice versa is a comparatively large stroke and the momentum cannot be dissipated effectively without compromising other aspects of the engraving process. The defects from these problems reduce the reproduction quality considerably.

The instant invention endeavors to eliminate the problems usually associated with the changes of the engraving needle from its rest position to the engraving position and vice versa.

SUMMARY OF THE INVENTION

One of the principal objects of the invention is a method for the reproduction of a printing form by the scanning point-by-point and line-by-line of an image pattern along successive cylindrical peripheral image lines, and engraving cavities along corresponding cylindrical peripheral engraving lines, wherein the engraving of the cavities is carried out by an engravig member including an engraving needle as a cutting tool, said engraving needle effecting a stroke into the engraving position whenever a cavity is to be engraved on an engraving line, including the steps of generating image signals from the image pattern from along one of the cylindrical peripheral image lines, reading the image signals into a storage device, reading the stored image signals out of the storage device and coupling the read-out image signals to said engraving member, engraving with the engraving member along a cylindrical peripheral engraving line corresponding to the one image, moving down said engravig needle into the engraving position at the beginning of one engraving line with a partial stroke length being less than the stroke length defined by the corresponding image signal, moving down said engraving needle into the engraving position during the engraving of several cavities of said engraving line with partial stroke lengths, which increase from cavity to cavity until said partial stroke length being substantially equal to the nominal value defined by the corresponding image signal, engraving the remainder of the engraving line in accordance with the corresponding readout image signals, re-engraving the incomplete cavities of said engraving line, lifting the engraving needle with several decreasing partial strokes into a rest position after an engraving line has been completed; and then, moving said engraving member to a succeeding cylindrical peripheral engraving line.

The division of large storkes of said engraving needle from its rest position into its engraving position and vice versa into partial stroke lengths being done in order to solve the afornentioned problems.

Further objects and advantages of the invention will be set forth in part in the following specification and in part will be obvious therefrom without being specifically referred to, the same being realized and attained as pointed out in the claims hereof.

The invention accordingly comprises the several steps and the relation of one or more of such steps with respect to each of the others, all as exemplified in the following detailed disclosure, and the scope of the application of which will be indicated in the claims.

In addition, the invention comprises the features of construction, combination of elements, and arrangement of parts which will be exemplified in a construction hereinafter set forth and the scope of the application of which will be indicated in the claims.

For a fuller understanding of the nature and objects of the invention, reference should be had to the following detailed description, taken in connection with the accompanying drawings, in which.

DESCRIPTION OF THE PREFERRED EMBODIMENTS

In carrying the instant invention into effect, some embodiments have been selected for illustration in the accompanying drawings and for description in the specification, reference being had to FIGS. 1 to 5.

Reference is had to thd aforementioned Baar et al patent application and the disclosure of that application is incorporated herein by reference because the instant invention is an improvement over that invention.

Figure 1:
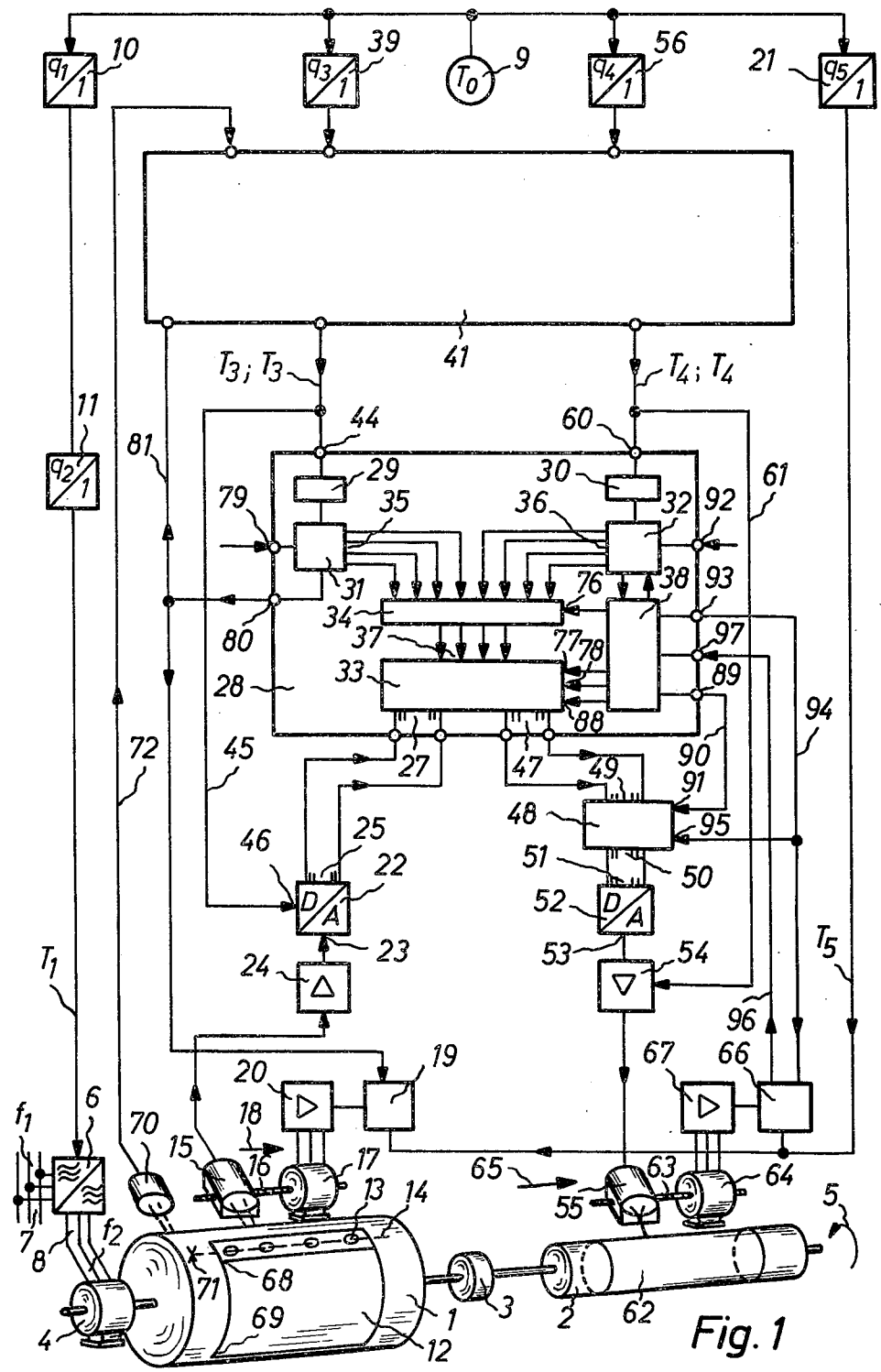
FIG. 1 is a block diagram for a block system for the instant invention.
Figure 2:
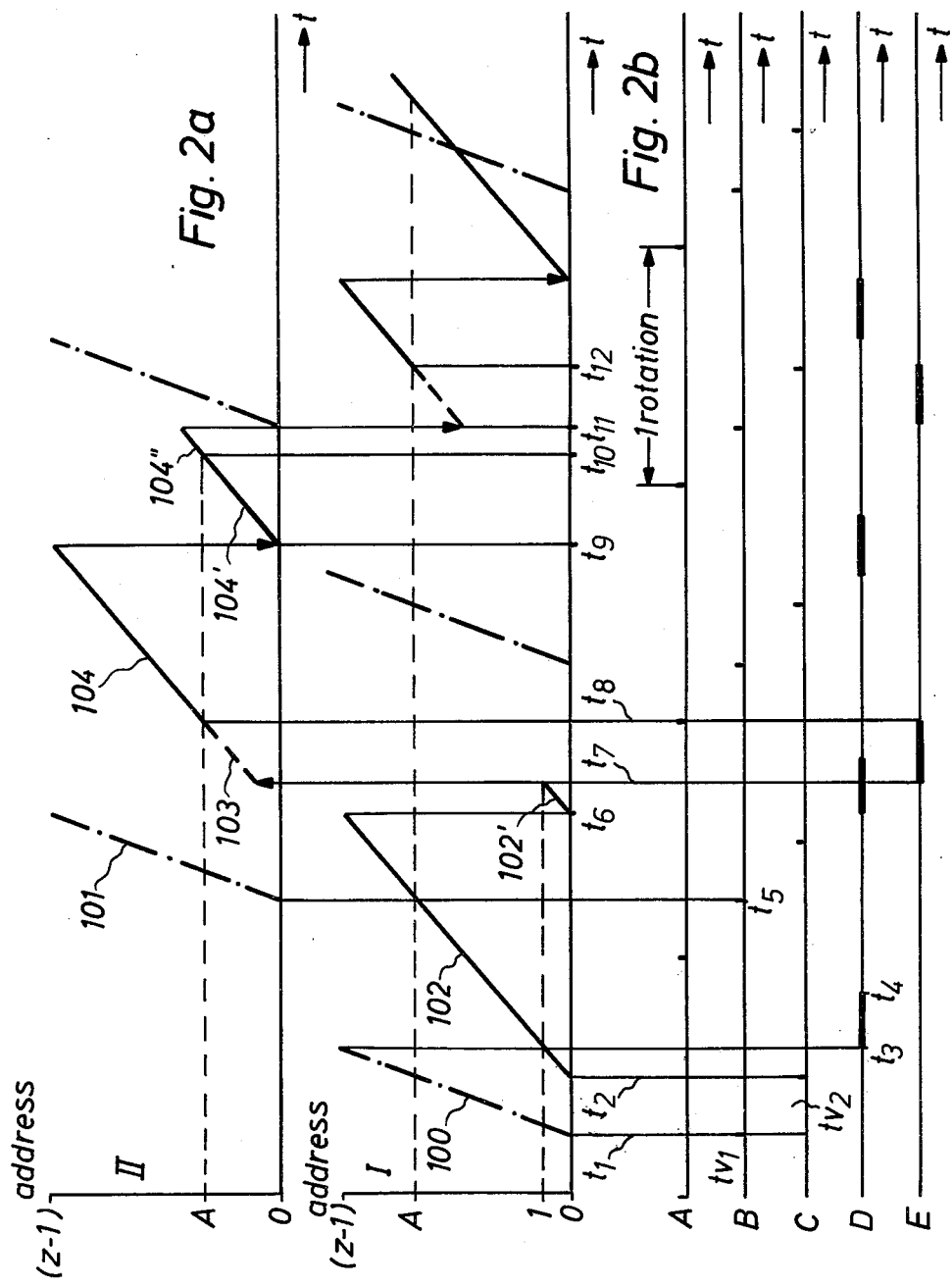
FIGS. 2a and 2b are graphs showing the time relationships during the instant process.

In particular, FIG. 1 herein corresponds in the essential blocks to the FIG. 1 of the aforementioned patent application.

A scanning cylinder 1 and an engraving cylinder 2 are connected to each other by a coupling 3 and are jointly driven by a synchronous motor 4 in the direction of the arrow 5. The synchronous motor 4 is energized from a power supply having a frequency $f_1$ to a converter 6. The converter 6 generates its signal from the power supply lines 8 which carry a signal having a frequency of $f_2$ which depends upon the frequency of a timing signal $T_1$ which is connected to the converter 6. The rate of rotation of the synchronous motor 4 is proportional to the frequency $f_2$ and is also proportional to the frequency of the timing signal $T_1$.

The timing signal $T_1$ is obtained from the frequency division of a timing signal $T_0$ which is generated by generator 9. The frequency division is carried out by a first dividing stage 10 having a dividing factor of $q_1$ which is adjustable and another dividing stage 11 having a constant dividing factor $q_2$.

The adjustment of the dividing factor $q_1$ of the dividing stae 10 changes the frequency of the timing signal $T_1$ and, in turn, the rate of revolution of the synchronous motor 4. This provides a control for the rate of revolution of the image cylinder 1 and the engraving cylinder 2.

The image pattern 12 is connected to the surface of the image cylinder 1 by use of a row of alignment pins 13 which are disposed along a surface line 14 and are accurately positioned.

The image pattern 12 is optically scanned image line by image line by means of a scanning member 15 to generate an image signal. The scanning member 15 can be moved parallel to the axis of the image cylinder 1 in the direction of the arrow 18 by the use of a spindle 16 and a stepping motor 17. The stepping motor 17 receives a timing signal $T_5$ through a motor control stage 19 and a power amplifier 20. The timing signal $T_5$ is generated through the division of the timing signal $T_0$ in a dividing stage 21 having a dividing factor $q_5$.

The image signals are in analog form and must be converted to digital signals. The scanning member 15 is coupled to an amplifier 24 which is connected by line 23 to an analog to digital converter 22. The digital signal from the converter 22 is connected by lines 25 to the input terminals 27 of storage device 28. The storage device 28 includes a delay stage 29, another delay stage 30, a recording-address counter 31, a reading-address counter 32, a storage unit 33, a multiplexer 34 for selectively connecting the output terminals 35 of the recording-address counter 31 or the output terminals 36 of the reading-address counter 32 through the address input terminals 37 of the storage unit 33 and a storage control unit 38 for the control of the read-in and read-out processes.

A scanning timing signal $T_3$ having a frequency of $f_3$ is used to control the converter 22 and the recording-address counter 31. The timing signal $T_3$ is obtained by the frequency division of the timing signal $T_0$ in a dividing stage 39 having a dividing factor of $q_3$ which is adjustable.

A control 41 supplies the timing signal $T_3$ to the input terminal 44 of the storage device 28 in order to control the selection of the recording-addresses and through line 45 to the input terminal 46 of the converter 22 in order to control the analog to digital conversion.

The beginning of a scanning line is established when the edge 68 of the image pattern 12 is scanned. This signal is delayed in time with respect to a peripheral pulse signal. The peripheral pulse signal is generated by scanning a marker 71 and the image cylinder 1 by means of sensor 70 which is connected by line 72 to control 41.

The scanning at the end of an image line at the lower edge 69 of the image pattern 12 generates a scanning end signal in the storage device 28 which is connected, through line 81 to the motor control stage 49 and in addition to the control 41. This command signal results in the axial increment or step of the scanning member 15 and in an interruption of the timing signal $T_3$.

Each time the scanning begin command signal occurs, it starts the scanning timing signal $T_3$ at a fixed point in time and in a defined phase position. On the other hand, the scanning end command signal interrupts the scanning timing signal $T_3$. These processes are controlled by the control 41 which is similar to the control 43 in the aforementioned patent application.

To read-out image signals which have been stored, the output terminals 47 of the storage device 28 are coupled to the coding control 48 and through lines 51 to the digital to analog converter 52. The line 53 from the converter 52 couples analog signals to amplifier 54 which is coupled to the engraving member 55.

A timing signal $T_4$ controls the engraving and read-out of image signals from the storage device 28 and for the screening of the image pattern 12 during the engraving. The timing signal $T_4$ is obtained frequency dividing the timing signal $T_0$ in a divider stage 56. This timing signal $T_4$ is coupled via the control 41 to the input-terminals 60 of the storage device 28 and to the amplifier 54 by line 61.

The timing signal $T_4$ is converted into a sinusoidal signal in the amplifier 54 and is superimposed over the image signals. The engraving member 55 utilizes an engraving needle or stylus as a cutting tool to engrave 62 on the engraving cylinder 2.

The engraving member 55 can be moved by the moving system including the spindle 63 and step motor 64. This movement is parallel to the axis of the engraving cylinder 2 in the direction of the arrow 65. The step motor 64 is energized by the timing signal $T_5$ which is controlled by motor control stage 66 and amplifier 67.

The scanning member 15 and the engraving member 55 are not moved during the scanning or engraving of a line. Thus, the scanned image lines are circular peripheral lines as are the engraving lines.

The number of engraved cavities per peripheral line on the engraving cylinder 2 is sum number $Z_D$. The depth of the respective cavities is determined by the tone-value assigned to the respective image points on the image pattern 12. A number of image points scanned from the beginning to the end of an image line on the image pattern 12 equals the number $Z_D$.

For each pulse or cycle of the timing signal $T_3$, the image point just within the radius of action of the scanning member 15 is scanned. According to the arrangement, the first image point is under the scanning member 15 on the occurrence of the first scanning pulse signal of the timing signal $T_3$. This first pulse signal also energizes the converter 22 and introduces the digitizing of the image signal corresponding to the first image point and the output terminal 25 then provides the data for the read-in to the storage device 28.

The storage control unit 38 generates a command signal which is coupled to the terminal 76 of the multiplexer 34 so that the output terminals 35 of the recording-address counter 31 are switched to the input terminals 37 of the storage unit 33. An additional command for "region change" to the control input terminal 77 of the storage device 33 from the control unit 38 selects the first storage region.

Thereafter, the initial address $A_0$ of the first storage region is selected for the first image point.

The data corresponding to the first image point are read-in under the control of the storage control unit 38 which is coupled to terminal 78 of the storage device 33.

The second address $A_1$ is selected for the second image point by increasing the count of the recording address counter 31 from 0 to 1 by the use of the timing signal $T_3$ delayed in the delay stage 29. The delay is selected so that the read-in is finished before the address increase.

The second pulse signal of the timing signal $T_3$ over line 45 to the coverter 22 introduces the digitizing of the image signal for the second image point. After the conversion time, the data of the second image point is stored under the command for the read-in from the storage control unit 38. The second pulse signal of the timing signal $T_3$ is delayed by the delay stage 29 and then increases the address from 1 to 2 for the read-in of the third image point data under address $A_2$. With the $Z_{th}$ pulse signal, the last image point of the first image line is stored under the last address $A(7-1)$ of the first storage area. The recording address counter 31 is selected by the programming input terminal 79 to have a number $Z_A$ so that it returns after this number of pulse signals of the timing signal $T_3$ in order to select the initial address $A_0$. At the completion of the read-in of the data for the first image line, the scanning advance step is triggered by a command for a change of region from the storage control unit 38 and this selects the second storage area.

The second image line is scanned from the upper edge 68 to the lower edge 69 and the analog image signal is digitalized and the data are read-in into the second storage area. The read-in is initiated by the command for begin scanning which is produced after a full revolution of the image cylinder 1 and ended by the command for end of scanning by the storage device 28.

At the start of the engraving, the control 41 releases the timing signal $T_4$ so that the first pulse signal is coupled to the input terminal 60 of the storage device 28.

The output terminals 36 of the reading-address counter 32 are connected to the address input terminals 37 of the storage unit 33 under command of the storage control unit 38 to the selection input terminal 76 of the multiplexer 34. A subsequent command for a change of region at the input terminal 77 of the storage unit 33 will again select the first storage region.

The subsequent selection of the first storage region again selects the initial address $A_0$ under which the data of the first image point of the first image line is stored. The read-out of data is the result of a command signal from the storage control unit 38 at the input terminal 88 of the storage unit 33 when the first pulse signal of the timing signal $T_4$ appears the terminal 60 of the storage device 28.

The read-out image signal for the first cavity to be engraved appears at the output terminal 47 of the storage device 28 and is coupled to the converter 52 where it is converted into an analog signal.

The value of the analog signal represents the tone-value and thereby determines the cutting depth for the cavity.

At the start of the engraving for any engraving line, the engraving needle of the engraving member 55 undergoes a relatively long stroke because it is changed from its unenergized or rest position to the cutting depth for the cavity.

The instant invention reduces the overall stroke length of the engraving needle by splitting up into several partial stroke length and be carrying out the engraving of cavities of each engraving line in separate steps.

In a first step the engraving needle moves down from its rest position into its engraving position with several partial strokes. When the first pulse signal of the timing signal $T_4$ occurs, the engraving needle moves down with a partial stroke. Then the partial strokes increase from pulse signal to pulse signal until the partial stroke length is equal to the nominal value. The residual cavities of this engraving line are engraved with depths corresponding to the actual image signals.

When the engraving needle is moved down into its engraving position with partial strokes, the needle either doesn't touch the surface of the engraving cylinder 2 whereby no cavities are engraved or does engrave cavities having depth smaller than the depths specified by the image signals for that points. The case, which will occur, is dependent on the tone-value of the corresponding image points.

In both cases the cavities are incomplete and have to be re-engraved in a second step at the beginning of the next revolution of the engraving cylinder with strokes of the nominal values to obtain cavities corresponding to the respective image signals. The reduced stroke lengths are obtained by code converting of the digital image signals corresponding to the nominal stroke lengths.

Preferably the reduced stroke length for the first pulse signal of the timing signal $T_4$ is half of the stroke length defined by the respective image signal.

This first partial stroke occurs during the first pulse signal of said timing signal $T_4$. The second cavity and the other cavities of one engraving line already correspond to the actual image signals.

Subsequently, the first incomplete cavity is reengraved with a stroke of the nominal value.

The data read-out of the storage unit 33 is connected to the coding control 48 and then coupled to the converter 52. A command signal is generated by the storage control unit 38 and coupled from the upper terminal 89 over line 90 to the input terminal 91 of the coding control 48. It is also possible to reduce the stroke length by reducing the value of the analog signal corresponding to the image signal.

All of the remaining cavities of the first image line are engraved in accordance with the read-out image signals. The first pulse signal of the timing signal $T_4$ is delayed in the delay stage 30 of the storage device 28 so that the address $A_1$ is selected in order to read-out the data for the second image point of the first image line. The read-out of the data and the engraving of the second cavity follows from the second pulse signal of the timing signal $T_4$.

When the $Z_{th}$ pulse signal of the timing signal $T_4$ occurs, the data of the last image point of the first image line is read-out of the first storage region of the storage unit 33. This ends the read-out process of the first image line and on the engraving cylinder 2 $Z_D$ cavities have been engraved on one peripheral engraving line.

The read-out of the data of the second image line is interrupted until the following processes have been completed.

First, in accordance with the instant invention, there is re-engraved at the start of the second revolution of the engraving cylinder 2, the incomplete first cavity then having a depth in accordance with the tone-value of the corresponding image signal.

Then, the engraving needle is de-energized and lifted from its engraving position into its rest position with a relatively long stroke. After this the engraving member 55 is advanced to a position for engraving the second engraving line.

The instant invention reduces the overall stroke length for the engraving needle by splitting up the nominal stroke length into several partial strokes, which are effected during the pulse signals of the timing signal $T_4$ occur.

Preferably to reduce the stroke width the engraving needle is permitted to dip about ½ a stroke into the second cavity before the engraving is de-energized and return to its rest position. The engraving needle does not change the second cavity and under this process, the errors found in the prior art are avoided.

The process is carried out as follows:

The reading address counter 32 is preset by the programming input terminal 92 to have a counting capacity $Z_D$ and it is reset by the delayed $Z_{th}$ pulse signal of the timing signal $T_4$. This selects the address $A_0$.

The (Z+1)th pulse signal of the timing signal $T_4$ selects the address $A_1$ and the data is halved by the coding control 48 to obtain a stroke length ½ of the length specified by the image signal.

Then, a command signal for the end of the engraving appears at the output terminal 93 of the storage device 28 under the control of the storage control unit 38 which is coupled by line 94 to the motor control stage 66 in order to start the step motor 64. At the same time, this command is carried to the input terminal 95 of the coding control 48 so that the engraving needle returns to its rest position. The step motor 64 displaces the engraving member 55 by a distance of two engraving lines in the direction of the arrow 65.

When the movement of the engraving member 55 has ended, the motor control stage 66 generates a command for the end of the advance over line 96 to the input 97 of the storage device 28 in the storage control unit 38 so that the read-out of the data of the second image line can begin.

During the advance of the engraving member 55, the reading-address counter 32 has continued its counting cycle. At the time of the command for the end of the advance, the reading-address counter 32 might have just selected the address $A_a$. The address $A_a$ is recorded as the initial address for the read-out and the read-out proceeds with the engraving starting at the position which happens to be located under the engraving member 55.

After the command for the advance end, the engraving needle must be returned to its engraving position. The first stroke is reduced by substantially diminishing, preferably halfing the designated stroke length associated with the address $A_a$.

The first cavity is then engraved with a partial stroke and the cavities for the addresses $A_{a+1}$ to $A_{-1}$ with a full stroke. To complete the engraving of the engraving line the cavities which could not cut during the advancement of the engraving member 55, corresponding to the addresses $A_0$ to $A_{a-1}$ are engraved.

Next, the correct cavity depth of the address $A_a$ is engraved and the engraving of the second engraving line has been completed and the command for the advancement of the engraving member 55 can be generated.

FIG. 1 shows an engraving process including intermediate storing of the image signals so that during the advancement of the engraving member to the next engraving line, the engraving is interrupted and subsequently, the portion of the engraving line omitted is engraved after a full revolution of the engraving cylinder.

The operation of an engraving member utilizing partial strokes according to the instant invention can be used in prior art engraving systems without the use of intermediate storing but with step advance.

Reference is had to FIGS. 2a and 2b wherein the timing relationships for the read-in and read-out of data is shown.

In FIG. 2a, the ordinate represents the addresses from $A_0$ to $A_{z-1}$ for the case wherein Z cavities are to be engraved along an engraving line. The abscissa is time.

Section I shows the operation of the first storage region while Section II shows the operation of the second storage region for the storage device 33.

FIG. 2b shows the time base co-ordination for the reference pulse signal (A) of the command to start scanning operation (B), the command to start engraving operation (C), the time for the forward thrust of the scanning member 15 (D), and the time for the forward thrust of the engraving member 55 (E).

The image line storage takes place in the following manner. At the time $T_0$, the reference pulse signal is generated and delayed by the time $t_{v1}$ to the command for start of scanning operation at the time $t_1$. At the time $t_1$, the read-in of data for the first scanned image line begins in the first storage region at the initial address $A_0$. The read-in process ends at the time $t_3$ with the storage of the data of the last image point of the first image line. The read-in process is represented by the straight line 100. At the time $t_3$, the forward thrust or advancement of the scanning member 15 takes place and is finished at the time $t_4$. At the time $t_5$, there appears the command for the start of scanning operation after one revolution and the read-in process for the data of the second image line into the second storage region begins as represented by the line 101.

The data of the image lines are alternately read in into the first and second storage regions. At the time $t_2$, the command for the start of engraving operation appears after it has been delayed with respect to the start of the scanning operation by the time $t_{v2}$. From this, the read-out of the data of the first image line is initiated as represented by the line 102. The read-out process ends at the time $t_6$ with the reading of the data in the final address.

In correspondence to the ratio of the circumferences of the cylinders, the read-out time $t_6-t_2$ lasts substantially 3 times as long as the read-in time $t_3-t_1$ for the exemplifield ratio of cylinder 3:1. This is manifest in the difference in the slopes of the lines 100 and 102.

At the time $t_2$, the data read-out of the initial address $A_0$ produces a stroke length of substantially ½ the designated length.

At the time $t_7$, a complete engraving line has been engraved and the storage is changed to the second storage region and the advancement of the engraving member 55 ends at time $t_8$. The selection of addresses is cyclically and independent of the advancement of the engraving member so that address $A_a$ has been reached at the time $t_8$ and this is indicated by the broken line 103.

At the time $t_8$, the read-out of the data for the second image line starts as indicated by the line 104 and as characterized by an initial stroke length of ½ the designated length. At the time $t_9$, the data under the address $A_{z-1}$ is read out. There still remains, however, data at the addresses $A_0$ to $A_{a-1}$ at the addresses $A_0$ to $A_{a-1}$ which could not be read-out because of the advance movement during the time $t_8-t_6$.

The read-out of this data is indicated by the line 104' which begins at the time $t_9$ and ends at the time $t_{10}$. The subsequent engraving of the second engraving line is illustrated by the line 104" which ends at the time $t_{11}$ with the push-up of the engraving needle. This is followed by the advance movement of the engraving member which ends at the time $t_{12}$ and leads to the starting of the read-in of the third image line.

Figure 3:
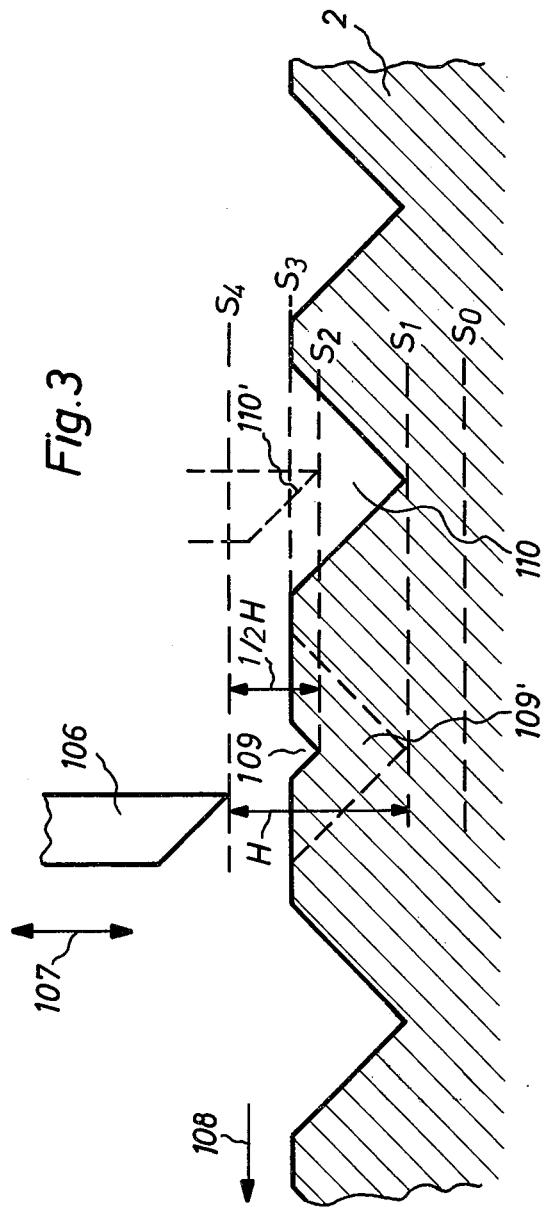
FIG. 3 is a partial sectional view of an engraving cylinder.

FIG. 3 shows a clarification of the instant invention with respect to the engraving by the engraving needle 106.

The direction of movement of the engraving needle 106 with respect to the engraving member 55 is indicated by the double-headed arrow 107. The arrow 108 shows the direction of movement of the engraving cylinder with respect to the engraving needle 106.

The special positions of the engraving needle 106 during its stroke movement from the rest position above the surface of the engraving cylinder 2 is shown and several engraved cavities are shown for comparison sake. A cavity corresponding to a tone-value for "black" would have a depth corresponding to a step number $S_0 = 0$.

The step number $S_3 = 212$ corresponds to the tone-value "white" and marks the level of the engraving needle 106 where it just touches the surface of the engraving cylinder 2. Between the tone-value for black and white there are 212 tone-values or step numbers S. The step number $S_4 = 255$ corresponds to the rest position of the engraving needle 106.

The engraving needle 106 remains in the rest position, step number $S_4$, between the engraving of the engraving line.

In accordance with the invention, the first cavity engraved in a new engraving line is engraved with a stroke ½ of the proper stroke length. If the first image signal for the engraving line specifies a cutting depth equal to a number $S_1$, the partial stroke will be $S_2$. The second cavity and subsequent cavities are engraved thereafter according to their respective designated amounts.

The value of the step number $S_2$ is obtained from the following relationship:

$$S_2 = \frac{S_4 - S_1}{2} + S_1$$

$$S_2 = \frac{S_1}{2} + \frac{S_4}{2}.$$

After a revolution of the engraving cylinder 2, the engraving needle 106 and the engraving cylinder 2 are in the position as shown.

Now, the first cavity 109 which was not engraved according to the designated value in the respective image signal is engraved the proper depth which in this case is $S_1$. After the cavity 109 is properly cut, the engraving needle 106 is allowed to dip ½ the proper stroke length into the already fully engraved second cavity 110 before it returns to its rest position step number $S_4$. This process is indicated by the broken line 110'.

Figure 4:
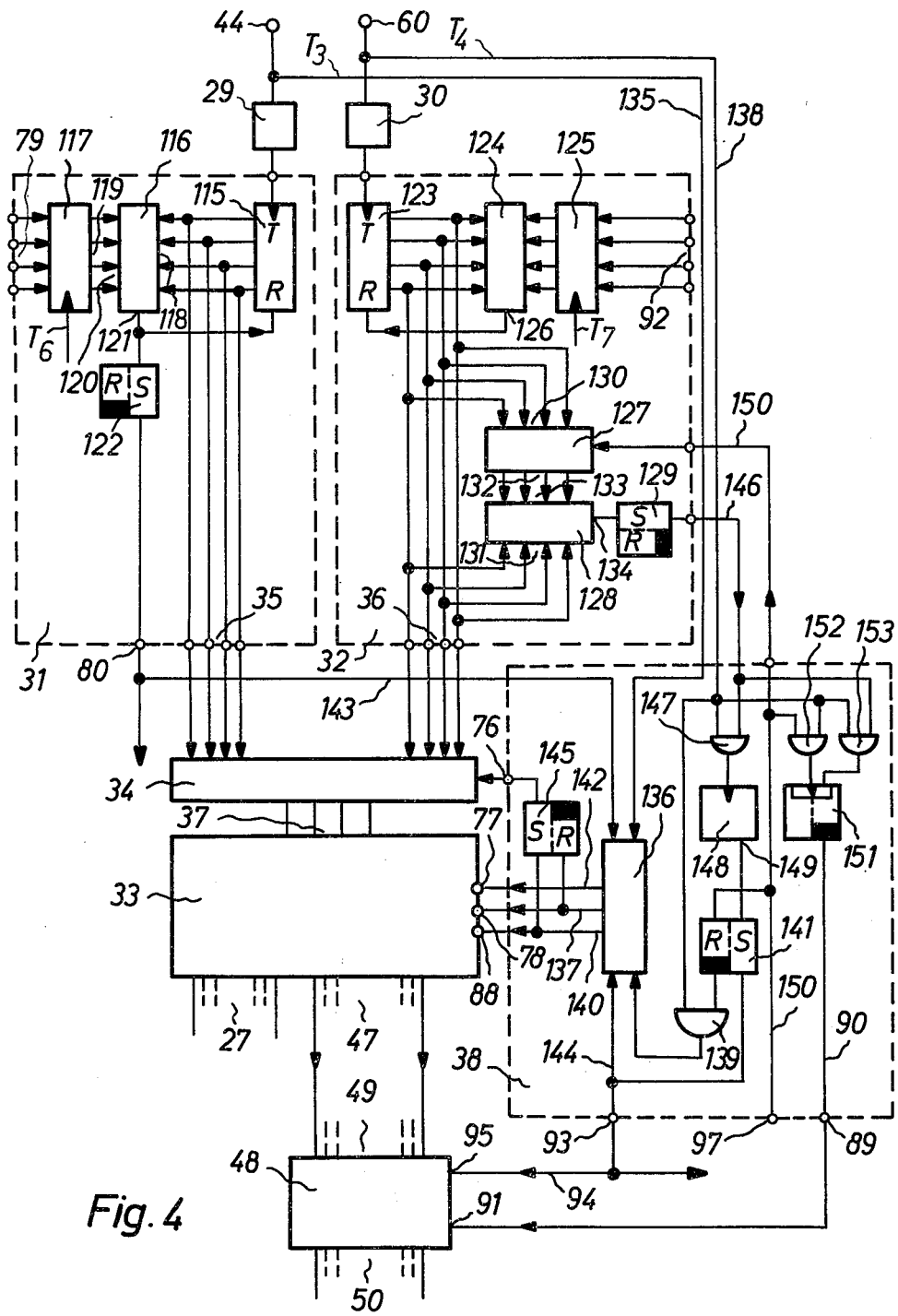
FIG. 4 is a block diagram for an image line storage arrangement.

FIG. 4 shows the storage device 28 in more detail. The functional blocks of the storage device 28 will be considered in detail now.

The recording address counter 31 includes a binary counter 115, a comparator 116, and a register 117.

These blocks and the other blocks mentioned herein are commercially available and are well known in the art so that detailed descriptions of their functions are considered superfluous.

The clock input terminal T of the binary counter 115 is energized by the delay step 29 of the timing signal $T_3$ which is connected to the input terminal 44. The output terminals of the recording address counter 31 are connected to the B-input terminals 118 of the comparator 116. The output terminals 119 of the register 117 are connected to the A-input terminals 120 of the comparator 116. The information input terminals of the register 117 are identical with the programming input terminal 79 of the storage device 28. Through the input terminal 79, the number $Z_A$ of the image points to be scanned per revolution of the cylinder is emptied into the register 117 as binary information A by means of the timing signal $T_6$. The comparator 116 compares the information A with the information B appearing at the output terminals 35 of the binary counter 115. For identical information, the comparator 16 generates a pulse signal at its output terminals 121 to the input terminal R of the binary counter 115 and to the setting input terminal of the flip-flop 122, the Q-output terminal of which is connected to the output terminal 80 of the storage device 28.

After $Z_A$ beats of the timing signal $T_3$, the binary counter 115 is reset.

The reading address counter 32 similarly includes a binary counter 123, a comparator 124, and a register 125. The clock input terminal T of the binary counter 123 is energized by the delay step 30 with the timing signal $T_4$ connected to the input terminal 60. The output terminals of the binary counter 123 are identical with the output terminals 36 of the reading address counter 32.

The information input terminals 125 are the programming input terminals 92 of the storage device 28. The programming information for the number of cavities $Z_D$ to be engraved in a revolution are entered in the input terminal 92 in order to set the register 125 as to the binary information A by means of the timing signal $T_7$. The comparator 124 compares the information A from the binary counter 123 continuously with the information B stored in the register 125. For identical information the comparator 124 generates at the output terminal 126 a pulse signal which set back the binary counter 123 by $Z_D$ counts of the timing signal $T_4$.

The reading address counter 32 also includes a register 127, a comparator 128, and a flip-flop 129.

The operation of these blocks is described with respect to the storage control unit 38.

The multiplexer 34 connects the output terminals 35 of the recording address counter 31 to the input terminal 37 of the storage device 33 during the read-in time and it connects the output terminals 36 to the input terminal 37 during the read-out time.

The storage device 33 is arranged to have at least two storage regions. The address of the individual storage places can be selected by the input terminals 37 by the recording address counter 31 or the reading address counter 32. The scanning timing signal $T_3$ controls the digital process of the image signal and the address selection during the read-in.

The read-in and read-out of data for the storage device 33 and the change of the storage region is controlled by the storage control unit 38 through the input terminal 77, 78, and 88 of the storage unit 33. The input terminals 27 of the storage unit 33 are connected to the converter 22. The output terminals 47 are joined to the input terminals 49 of the coding control 48.

The storage control unit 38 produces the control command for the storage unit 33, multiplexer 34, and the motor control stage 66.

The pointing time when data is read-in is determined by the heat timing of the timing signal $T_3$ and the read-out is controlled by the beat timing of the timing signal $T_4$.

Thus, the order to read-in is determined by the timing signal $T_3$. For this purpose, the input terminal 44 of the recording address counter 31 is connected by line 135 to a storage control switch 136. The order to read-in reaches the storage control switch 136 over the line 137 which is connected to the input terminal 78 of the storage unit 33.

The command to "read" for the storage unit 33 is generated by the timing signal $T_4$ which is connected to the input terminal 60 of the reading address-counter 32 over the line 138 and an AND-gate 139 to the storage control switch 136. From the AND-gate 139, the timing signal $T_4$ and the order to read is gated out during the period the engraving member 55 is advanced so that no data can be read-out of the storage unit 33.

The order to read reaches the storage control switch 136 over a line 140 which is connected to the input terminal 88 of the storage unit 33. The AND-gate 139 is controlled by the Q-output signal of the flip-flop 141. The Q-terminal of the flip-flop 141 forms the output terminal 93 of the storage control unit 38 for the command to advance.

The command to change storage area depends upon the timing signal $T_3$, the timing signal $T_4$, and the commands to end scanning and advance.

These commands are coupled by line 142 to the input terminal 77 of the storage unit 33.

The command to end scanning comes from the control output terminal 80 of the recording address counter 31 over the line 143 and the command to advance from the Q output terminal of the flip-flop 141 is coupled over the line 144 to the storage control switch 136.

The switching of the writing or reading addresses to the address input terminals 37 of the storage unit 33 by means of the multiplexer 34 is controlled by a flip-flop 145 which generates commands for read and write. The input terminal for setting the flip-flop 145 is connected to the line 140 and the return set input terminal is connected to the line 137. The Q-output terminal of the flip-flop 145 is coupled to the selection input terminal 76 of the multiplexer 34.

To produce the command to advance, the Q output terminal of the flip-flop 129 in the reading address counter 32 is connected to line 146 and a AND-gate 147 to the input terminal of a counter 148 which is preset to the number 2. The output terminal of the counter 148 is coupled to line 149 to a setting input terminal of the flip-flop 141 which is set back over line 150 by the command to end advance.

The operation of the storage control unit 38 is as follows.

First, the data from the first image point of the first image line is read-in. The Q-output terminal of the flip-flop 145 and the selection input terminal 76 of the multiplexer 34 is in the high region. Then, the output terminals 35 of the recording address counter 31 are connected to the address input terminals 37 of the storage unit 33. The storage control switch 136 has selected the first region of the storage unit 33. When the recording address counter 31 is reset, the initial address is selected. The first occurrence of the pulse signal in the timing signal $T_3$ generates the command to write in the control input terminal 78 and the data of the first image point is read-in under the initial address of the first storage region. The read-in process of the data of the first image line terminates with the switching over to the second storage region upon the command to end scanning which is generated by the recording address counter 31 over the line 143 to the storage control switch 136.

Then, the data of the second image line is written into the second storage region. The reading in of the data of the other image lines follows alternately between the two storage regions.

The command to begin engraving starts the read-out process of the data for the first image line from the first storage region. The first pulse signal of the timing signal $T_4$ is coupled over the line 135 to the storage control switch 136 and carries the respective orders for selecting the first storage region and for reading the data.

Simultaneously, the flip-flop 145 is reset and the selection of the input terminal 76 of the multiplexer 34 reaches the L-area, and the output terminals 36 of the reading address counter 32 are coupled to the address input terminals 37 of the storage unit 33. The reading address counter 32 can be reset so that the initial address of the first storage region is selected when the data of the first image point of the first image line is stored. This data is coupled to the input terminal 49 of the coding control 48. When the flip-flop 151 in the storage control unit 38 is reset, the control input terminal 91 of the coding switch 48 is energized by the Q-output terminal of the flip-flop 151 with a high signal so that the read-out data of the first image point is re-coded. The modified data is then recorded and available at the output terminal 50 of the coding control 48.

The line 150 carries a high signal, the AND-gate 152 is set, and the negative side of the first pulse signal of the timing signal $T_4$ makes the flip-flop 151 change so that the low signal is coupled over the line 90 to the control input terminal 91 of the coding control 48.

The data of the first image line is read-out from the second to the $(Z+1)$th beat of the timing signal $T_4$ and this data remains unchanged at the output terminal 50 of the coding control 48. On the occurrence of the Zth beat, the data of the last image point of the first image line is read-out and the last cavity is engraved. Thereafter, a closed peripheral engraving line has been engraved, but the first cavity of the first image line must be re-engraved with the $(Z+1)$th beat.

The Zth beat of the timing signal $T_4$ also resets the reading address counter 32. The $(Z+1)$th beat selects again the initial address under which the data of the first image point is to be stored. This data also reaches the output terminal 50 unchanged so that the first cavity is re-engraved to its proper depth. This completes the engraving of the first image line and the engraving for the second image line is prepared for by returning the engraving needle to its rest position and by the advance of the engraving member 55.

In reading out the data of the last image point of the first image line, the Q-output terminal of the flip-flop 129 of the reading address counter 32 reaches the high region and the AND-gate 147 and 153 in the storage control unit 38 are energized over the line 146. The rear side of the $(Z+1)$th pulse signal sets the flip-flop 151 and the coding control 48 receives the high signal over the line 90.

The $(Z+2)$th beat selects again the address $A_1$ and reads out the data of the second image point. Due to the high signal at the control input terminal 91 of the coding control 48, this data is recorded, and the engraving needle dips once more into the already correctly engraved cavity.

The beat of the timing signal $T_4$ following the $(Z+1)$th beat reaches the input terminal of the counter 148 through the AND-gate 147. After the $(Z+2)$th beat, the counter 148 generates an output signal which sets the flip-flop 141.

These processes cause the following control functions. At first the AND-gate 139 is gated off so that during the advance period of the engraving member 55 there are no further beats of the timing signal $T_4$ reaching the storage control switch 136. That is, the reading process is interrupted.

Simultaneously, the storage control unit 38 through the control output terminal 93 generates the command to advance so that the engraving member 55 can be incremented. This command is also connected to the control input terminal 95 of the coding control 48 to the line 94 so that at the output terminal 50 of the coding control 48 there is a high signal and the engraving needle is lifted into its rest position.

During the advancing of the engraving member 55, the reading address counter 32 continues counting. At the end of the advance, there appears a command to end the advance at the control input terminal 97 of the storage control unit 38. At this point in time, the address $A_n$ is selected by the reading address counter 32 and recorded through line 150 into the register 127. Simultaneously, the command to end the advance sets the flip-flop back and ungates the AND-gate 139 for the timing signal $T_4$. This initiates the read-out process for the data of the second image line with the reading of the data starting under the address $A_a$. As the Q-output terminal of the flip-flop 151 is still high, the data is halved in the coding control 48 and the engraving needle carries out only substantially ½ of the coded stroke length.

The command to end the advance also energizes the AND-gate 152 to the first beat of the timing signal $T_4$ which follows the command to end the advance and changes the state of the flip-flop 151 so that the coding control 48 is then presented with a low signal. Thereafter, the data selected by the second and all the following beats are not changed in the coding control 48 and the corresponding cavities are engraved to the respective correct depths. The second beat again sets back the binary counter 123 to begin the reading out of the data under the addresses $A_0$ to $A_{n-1}$ and the engraving of the cavities not engraved during the period of advancement. When the reading address counter 32 has selected the address $A_a$, the comparator 128 which is comparing the addresses selected by the binary counter 123 with the addresses stored in the register A sets the flip-flop 129. At this time, the second engraving line is engraved.

Figure 5:
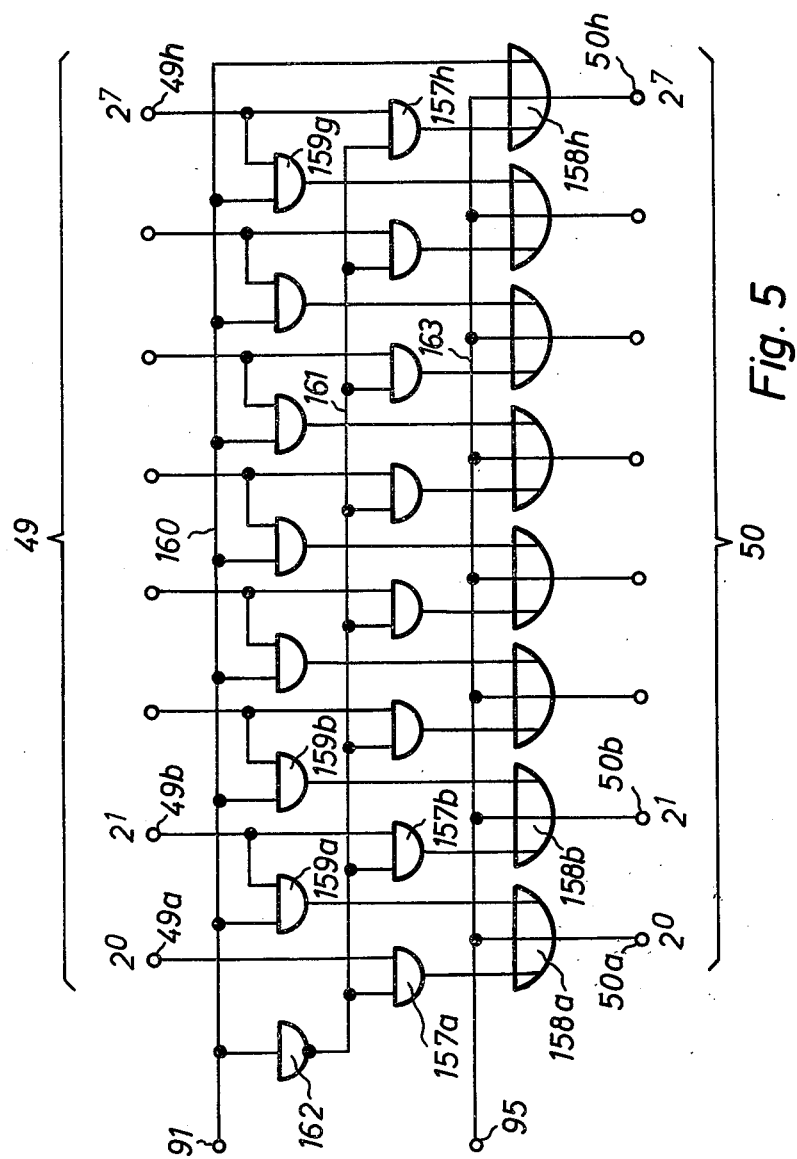
FIG. 5 is a block diagram for a coding system for use in the instant invention.

FIG. 5 shows in more detail the coding control 48 in which the ratio of the step numbers to one another is realized.

The step number $S_1$ indicates the stroke of the engraving needle with which it has to be deflected from its rest position in order to attain the desired coding depth or the desired tone-value of a cavity. The step number $S_1$ is stored as a 8-bit word for each cavity to be recorded.

The step number $S_2$ is also an 8-bit word and indicates the word which is read out instead of the word $S_1$ and which must be coupled to the converter 52 so that the engraving needle carries out only about ½ of its stroke.

The step number $S_4 = 255$ corresponds to the dual number 11111111 characterizes the rest position of the engraving needle.

The some term $S_1/2$ is derived from $S_1$ by reducing the values of each figure of the dual number by 1, and by omitting the figure that has the lowest value. The some term $S_4/2 = 2^7$ corresponds to the dual number 10000000.

The data input terminal 49 of the coding control 48 is connected with the data output terminals 47 of the storage device 28 and the data output terminal 50 with the data input terminal 51 of the converter 52. Upward values are assigned to the data input terminals 49 and data output terminals 50.

To the data input terminal 49a and the data output terminal 50a, there are, for example, assigned the values $2^0$ and to the data input terminal 49h and the data output 50h the value $2^7$. The data input terminals 49 and the data output terminal 50 are coupled by gates.

The data input terminal 49a is in connection with the equal value data output terminal 50a through an AND-gate 157a and an OR-gate 158a. The data input terminal 49b can be connected by an AND-gate 157b as well as by an OR-gate 158b to the equivalent data output terminal 50b and also by an AND-gate 159a and the OR-gate 158a to the data output 50a of the lower value. The same way, all additional data input terminals can be connected with the equivalent data output terminals or with the data output terminals of lower values.

The further input terminals of the AND-gates 159a to 159g are coupled to a line 160 and the input terminals of the AND-gates 157a to 157h through a line 161 and an inverter 162 to the control input terminal 91 of the coding control 48.

The further input terminals of the OR-gates 158a to 158h are coupled to a further line 163 to the control input terminal 95 of the coding control 48.

For the low signal at the control input terminal 91 of the coding control 48, the AND-gates 159a to 159g are gated off and the AND-gates 157a to 157h are gated open. From this, the equivalent input terminals 49 are connected to the equivalent data output terminals 50. The data at the data output terminals 49 pass unchanged to the coding control 48. For the high signal at the control input terminal 91, the data input terminals 49 are connected to the data output terminals 50 of lower values, whereby the sum term $S_1/2$ is formed. Simultaneously, the data output terminal 50h is in the high region because an input terminal of the OR-gate 158h is connected to the line 160. This adds to the constant sum term $S_4/2 = 2^7$.

For the high signal at the control input terminal 95 of the coding control 48, all the data output terminals 50 are in the high region and correspond to the dual number 11111111. This number must be placed in the converter 52 if the engraving needle is to brought into its rest position.

We wish it to be understood that we do not desire to be limited to the exact details of construction shown and described, for obvious modifications will occur to a person skilled in the art.

Having described the invention, what we claim as new and desire to be secured by Letters Patent, is as follows:

1. A method for the reproduction of a printing form by the scanning point by point and line by line of an image pattern along successive cylindrical peripheral image lines and engraving cavities along corresponding cylindrical peripheral engraving lines, wherein the engraving of the cavities is carried out by an engraving member including an engraving needle as a cutting tool, said engraving needle effecting a stroke into the engraving position whenever a cavity is to be engraved on an engraving line, the steps comprising, generating image signals from said image pattern from along one of said image lines, said image signals representing the lengths of strokes of said engraving needle and the depths of the cavities to be engraved;

moving down said engraving needle into the engraving position at the beginning of one engraving line with a partial stroke length being less than the stroke lengths defined by the corresponding image signal;

moving down said engraving needle into the engraving position during the engraving of several cavities of said engraving line with partial stroke lengths, which increase from cavity to cavity until said partial stroke length being substantially equal to the nominal value defined by the corresponding image signal;

engraving the residual cavities of said engraving line to depths defined by the corresponding image signals; and then, re-engraving the incomplete cavities of said engraving line in accordance with the corresponding image signals.

2. The method as claimed in claim 1, wherein the engraving is carried out by an engraving member including an engraving needle as a cutting tool, said engraving needle effecting a stroke into an engraving position whenever a cavity is to be engraved on an engraving line, wherein said engraving needle moves down with a stroke length for engraving a first cavity of an engraving line to about half the stroke length defined by the corresponding image signal, subsequently, the engraving needle moves down with stroke lengths for engraving the residual cavities in said engraving line to the nominal value defined by the corresponding image signals, and then said first incomplete cavity is re-engraved in accordance with the corresponding image signal.

3. The method as claimed in claim 1, wherein the engraving is carried out by an engraving member including an engraving needle as a cutting tool, said engraving needle effecting a stroke into a rest position, further comprising the step of advancing the position of said engraving member for engraving a succeeding engraving line, wherein said engraving needle lifts with several decreasing partial strokes into the rest position after an engraving line has been completed and during the time the engraving member is to be advanced to a succeeding engraving line.

4. The method as claimed in claim 3, wherein said engraving needle of said engraving member lifts with one partial stroke into the rest position, the stroke length being half the nominal value defined by the corresponding image signal.

5. The method as claimed in claim 1, wherein the engraving is carried out by an engraving member and further comprising the step of advancing the position of the engraving member for engraving a succeeding engraving line immediately after engraving the incomplete cavities of the previous engraving line.

6. The method as claimed in claim 1, further comprising the step of storing the digitized image signals, said digital image signals represent the lengths of strokes of said engraving needle, wherein the partial stroke lengths are obtained by code converting of the digital image signals corresponding thereto.

7. A method for the production of a printing form by the scanning point-by-point and line-by-line of an image pattern along successive cylindrical peripheral image lines and engraving cavities along corresponding cylindrical peripheral engraving lines, the steps comprising:

generating image signals from said image pattern from along one of said cylindrical peripheral image lines;

reading said image signals into a storage device;

reading said stored image signals out of said storage device and coupling said read-out image signals to an engraving device;

engraving with said engraving device along a cylindrical peripheral engraving line corresponding to said one image line in response to said read-out image signals;

moving down the engraving needle of said engraving device into the engraving position at the beginning of one engraving line with a partial stroke length being less than the stroke length defined by the corresponding read-out image signal;

moving down said engraving needle into the engraving position during the engraving of several cavities of said engraving line with partial stroke lengths, which increase from cavity until said partial stroke length being substantially equal to the nominal value defined by the corresponding read-out image signal;

engraving the residual cavities of said engraving line to depths defined by the corresponding read-out image signals, re-engraving the incomplete cavities of said engraving line in accordance with the corresponding read-out image signals;

lifting the engraving needle of said engraving device with several decreasing partial strokes into the rest position after an engraving line has been completed; and then, moving said engraving device to a succeeding cylindrical peripheral engraving line.

8. An apparatus for the production of a printing form by the scanning point-by-point and line-by-line of an image pattern along successive cylindrical peripheral image lines and engraving cavities along corresponding cylindrical peripheral engraving lines, comprising, in combination:

scanning means operable for generating image signals from said image pattern from along one of said cylindrical peripheral image lines;

a storage device coupled to said scanning means and operable for storing said image signals;

read-in means coupled to said storage device and operable for reading-in said image signals, read-out means coupled to said storage device and operable for reading-out said stored image signals;

an engraving device, comprising an engraving member with an engraving needle as a cutting tool, effecting a stroke into the engraving position whenever a cavity is to be engraved and effecting a further stroke into the rest position after an engraving line has been completed, coding means coupled to said storage device and said engraving device and operable for code converting said stored image signals in order to vary the stroke lengths of said engraving needle; said coding means operable connected to the read-out means to control the code conversion in accordance with the read-out process of the stored image signals.

* * * * *